US006895333B2

(12) United States Patent
Hethuin et al.

(10) Patent No.: US 6,895,333 B2
(45) Date of Patent: May 17, 2005

(54) HIGH-PRECISION 3D POSITION-FINDING SYSTEM

(75) Inventors: Serge Hethuin, Courbevoie (FR); Grégoire Eumurian, Argenteuil (FR); Michel Giraudo, Rueil Malmaison (FR)

(73) Assignee: Thales, Paris (FR)

( * ) Notice: Subject to any disclaimer, the term of this patent is extended or adjusted under 35 U.S.C. 154(b) by 74 days.

(21) Appl. No.: 10/370,056

(22) Filed: Feb. 21, 2003

(65) Prior Publication Data

US 2003/0220092 A1 Nov. 27, 2003

(30) Foreign Application Priority Data

Feb. 22, 2002  (FR) ............................................ 02 02302

(51) Int. Cl.⁷ ............................................. H04M 11/04
(52) U.S. Cl. ................. 701/215; 455/404.2; 455/414.1; 455/456.1
(58) Field of Search ................................ 701/215, 213; 455/404.2, 414, 1, 456.1

(56) References Cited

U.S. PATENT DOCUMENTS 5,913,170 A * 6/1999 Wortham ..................... 455/457
6,449,558 B1 * 9/2002 Small ........................... 701/213

* cited by examiner

*Primary Examiner*—Thomas G. Black
*Assistant Examiner*—Christine M. Behncke
(74) *Attorney, Agent, or Firm*—Lowe Hauptman Gilman & Berner, LLP

(57) ABSTRACT

A precise 3D position-finding system and method comprises at least the following elements: a set of beacons working on the basis of differential global positioning satellites (DGPS), the beacons being connected to one another and temporally synchronized, spread-spectrum radio means between the members of the network whose position is to be located and said beacons, and a computation station. The computation station is provided with a processor adapted to finding the position of one or more elements from a list of direct paths and/or multiple paths with the time and direction of arrival of each of the direct paths and/or multiple paths, and from the position of the beacons and in taking account of data that represents obstacles.

20 Claims, 7 Drawing Sheets

HIGH-PRECISION 3D POSITION-FINDING SYSTEM

BACKGROUND OF THE INVENTION

1. Field of the Invention

The present invention relates to a high-precision 3D positioning (or position-finding method) for finding the position of elements or individuals. The precision is, for example, of the order of one meter.

The individuals may be located in an open environment or in an urban environment. The system is called a 3D system because of its ability to single out an individual across several floors for example, thus introducing precision along the z-axis if we take a classic x, y, z system of coordinates.

It can be applied, for example, to locating the position of the members of an action team (of firefighters, doctors, special forces, maintenance teams in high-risk zones etc). It also relates to a wider public including, for example, medical personnel in hospitals, elderly persons in retirement homes, victims of avalanches etc.

2. Description of the Prior Art

The currently used position-finding or positioning techniques draw extensively upon various techniques. Four of them are recalled here below.

1. GPS ("Global Positioning System") Type Satellite-based Positioning Systems

In a GPS type satellite-based positioning system, the geographical position of a GPS receiver is determined by a triangulation of the pseudo-distances between the receiver and a cluster of satellites. This is possible only if the element or individual to be located is visible to the satellites. This is not the case in a certain number of situations (for example in the case of masking by forest cover, tunnels, operations in buildings, underground parking lots, etc.). Furthermore, the precision of a standard GPS, (processing of the frequency L1, code C/A) is in the range of 25 to 30 meters and therefore does not make for precision in the range of one meter. Furthermore, the precision of GPS systems assisted by pedometer or by an inertial guidance unit, for example, remains limited.

2. Cell Radio Telephony Systems such as the GSM ("Global System for Mobile Communication") Enabling Mobiles to Communicate by Radio with Other Mobiles or with the Public Switched Telephony Network, by Means of Stations Situated at the Center of each Cell of the Cell Network In a GSM type communications system, the positions of the mobiles are located by a triangulation of the pseudo-distances measured between the mobile to be identified and the base stations. The initiative for measuring the pseudo-distances is taken either by the base stations neighboring the cell in which the mobile is moving or by the mobile. The precision of the position-finding obtained by this method is related to the density of the base stations: it is about 200 meters in urban areas and 400 meters in rural areas.

3. Radiofreguency Transmission Systems Based on Radio Direction-finding

In these systems, the positions of the mobiles are located:

Either by means of an autonomous search and position-finding device: in this case, the method makes use of a distance measurement by means of a transponder type principle (the search module sends out an interrogation signal to the element whose position is to be found or located, and this element instantaneously sends back the response signal) and a measurement of direction on this response signal. In this case, the method is generally of the "homing" type, i.e. the individual responsible for the search gradually approaches the mobile all long the period of movement. This is a highly uncertain technique because all that is needed is an obstacle to greatly weaken the signal and compromise the precision-finding process. Furthermore, the measurement of direction is often obtained by means of a directional antenna, because of the lack of precision and the space taken up by devices based on the differential measurement of phase between several antennas. This search by directional antenna also raises problems because it is imprecise with respect to the size of the antenna to be implemented.

Or by a triangulation of the pseudo-distances measured between the mobile to be identified and reference stations whose position is perfectly known. These stations are also perfectly synchronized, generally by cable, thus limiting the use to equipped zones only. Furthermore, the precision in these systems is always greatly affected, firstly by simultaneous transmissions (entailing collisions) from elements other than the one whose position is to be found or located and, secondly, by the many multiple paths encountered, especially in premises.

4. Badge/Beacon Type Devices

In systems based on a beacon/badge type device, the zone is equipped with beacons (each beacon demarcating a portion of the zone in the same way as the base stations in the cell networks but with a range of some meters to some tens of meters) and the mobiles are fitted out with a transponder badge (which may be passive or active). The beacons are interconnected by a local area network and, when a mobile passes before one of them, a message is sent to the general monitoring center to update the position file. These systems are not compatible with outdoor use and require installation prior to any use in buildings. Furthermore, the precision of these devices is not greater than that of the range of each of these beacons, i.e. it is of the order of some tens of meters.

The object of the invention in particular is a 3D position-finding system with a precision of one meter for example, outdoors or indoors, at any floor whatsoever, without any interruption of operation.

The idea implemented in the method and in the system consists especially in using a mapping of the places associated with measurements of distance and angle, for example in order to reconstruct the direct paths and/or the multiple paths due to the different obstacles.

The beacons are designed to be easily installed, small-sized and low-cost devices, thus offering the possibility of being mounted on escort vehicles or moved according to the progress of positioning needs or the progress of the search or, again, recovered at the end of operation or, possibly, abandoned.

SUMMARY OF THE INVENTION

The invention uses especially a combination of beacons positioned and synchronized with precision, preferably by differential GPS, the beacons receiving the signals from the object or the person whose position is to be found or located. This person may be situated outdoors or indoors. The external beacons receive the signals from at least four satellites for example.

The invention relates to a precise 3D position-finding system comprising at least the following elements: a set of beacons working on the basis of differential global positioning satellites (DGPS), the beacons being connected to one another and time-synchronized or temporally synchronized, spread-spectrum radio means for connection between the members of the network whose position is to be located and said beacons, and a computation station. It is characterized in that the computation station is provided with a processor adapted to finding the position of one or more elements from a list of direct paths and/or multiple paths with the time and direction of arrival of each of the direct paths and/or multiple paths, and from the position of the beacons and in taking account of data that represents obstacles.

The number of beacons is equal, for example, to four. Three of these beacons are positioned in the same plane and the fourth has a given altitude relative to this plane.

The invention also pertains to a method for the 3D positioning of an element in a system comprising at least four beacons working on the basis of the differential global positioning system (DGPS), the beacons being temporally synchronized, wherein the system comprises at least the following steps:

the transmission, by a beacon, of its DGPS position and of a list of multiple paths with the time and direction of arrival of each of the direct paths and/or the multiple paths sent by the element whose position is to be located, temporal or time readjustment, if necessary, in the event of a detected shift of one or more beacons, the computation of the estimated positions of the element for the context of information received from each beacon, a processing of the data using a mapping or a topology of the environment in which the element whose position is to be located is placed to reconstruct the different direct paths and/or multiple paths and to select the multiple paths to achieve a precise 3D determining of the element whose position is to be located.

The data-processing comprises a step to compare the retimed data and a step to eliminate information from the beacon or beacons that diverge excessively from the value indicated by the greatest number.

The invention has the following advantages in particular: it offers:

a solution for locating the position of individuals in "difficult" environments, namely urban environments such as buildings, basements etc., i.e. places where the GPS signals normally do not penetrate, an architecture that is simple and low-cost because it does not call for substantial deployment means. The beacons used are indeed small-sized and can therefore be moved, jettisoned, thrown out or easily positioned, and they are of moderate cost, the method is compatible with all standardized waveforms, making it possible, for example, to use the waveform best suited to the application envisaged: for example a PN code modulated signal, UWB-type wide spread-spectrum technology etc., it provides the possibility of locating the position of a group of persons or objects, members of a same radio network, it enables the locating of the position of the members of a same action team, but also facilitates the arrival of assistance or support at the precise places in which the persons in difficulty are placed or where there is an overload of persons.

BRIEF DESCRIPTION OF THE DRAWINGS

Other characteristics and advantages of the object of the present invention shall appear more clearly from the following description given by way of an illustration that in no way restricts the scope of the invention, and from the appended figures of which:

FIG. 1 shows a position-finding system according to the invention comprising at least four beacons $B_1$, $B_2$, $B_3$, $B_4$ (one of them is not shown for reasons of simplification), linked with a reference station $B_{ref}$ having known coordinates. The four beacons work in differential GPS (or DGPS) mode with processing of the GPS carrier frequencies $L_1$ and $L_2$ (using the LRK algorithm for example). Three beacons are positioned in a same plane and the fourth beacon is placed outside this plane. For example, in FIG. 1, the beacon $B_3$ is positioned at a certain altitude $h_3$ defined relative to the reference plane determined by the other three beacons. An arrangement of this kind makes it possible to achieve position-finding precision of about one centimeter for each of the beacons, provided that the beacon is visible to at least four satellites.

Figure 1:
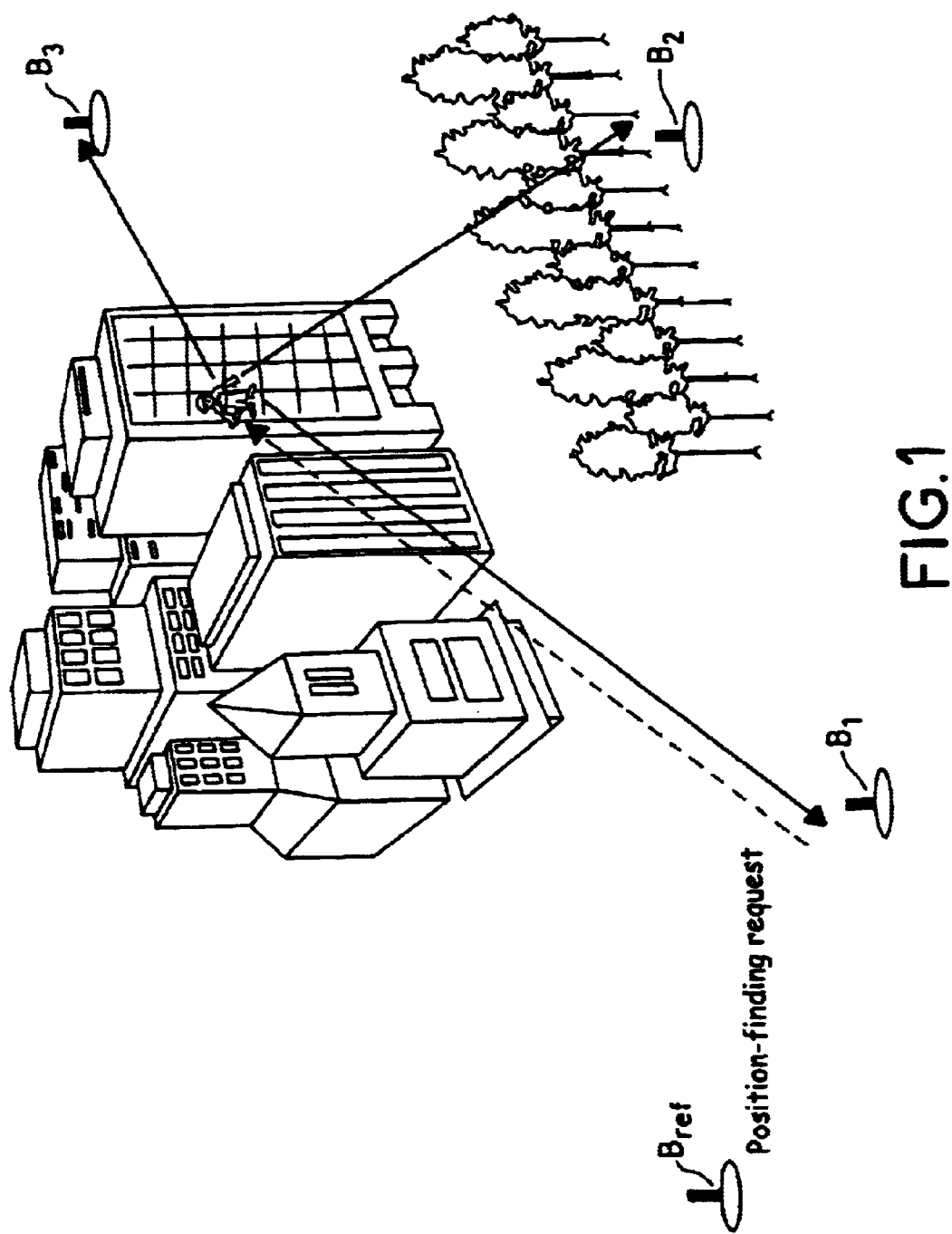
FIG. 1 exemplifies an architecture of the device according to the invention.

In general, the first three beacons are, for example, deployed on the ground and the fourth is positioned above or beneath it. This fourth beacon is identified by a positive or negative difference in height h, determined from the plane defined by the other three beacons, (for example a difference in level of 5 meters), depending on whether the position-finding pertains to elements in buildings or in basements.

The number of beacons working in DGPS mode is at least equal to or greater than 4. The distance di between each of these beacons and the reference station $B_{ref}$ may be, for example, several kilometers or even greater than 10 kilometers. The beacons are deployed either before an operation or else as and when required. They may be installed permanently. Choosing more than four beacons makes it possible especially to create redundancy and reject measurements from certain beacons deemed to be aberrations. Since each of the beacons can be recognized by its identification number and its position (each beacon is given an unambiguous identification number on four bytes for example, assigned in advance during manufacture and used also for its maintenance), the station in charge of the final computation can integrate all the information received. For example, as the firefighters or the police force move forward in an urban environment, the position-finding computation, depending on the place where the individual or the object to be located is situated, is done by certain of these beacons (the best-placed beacons) and then by others depending on the progress of the operations. The system also has a computation station $B_{cal}$ that may be one of the beacons of the system. The station is provided with a processor adapted to executing the steps described in the method, receiving the numerous echoes coming from one or more elements whose position is to be located, processing the signals received and identifying the multiple paths (direct and/or indirect paths) to be used. The processor is adapted to interpreting and collating the different direct and/or multiple paths given by the different beacons, from the echoes received and also comprises a database grouping together information defining a topography or a mapping of the places, in order to determine the real position of the element whose position is to be located.

The beacons are, for example, linked together by radio means known to those skilled in the art or else by wire means. They are time-synchronized, for example, by means of a fine temporal readjustment algorithm applied prior to the computation or at the final stage of the computation.

The beacons are also linked with the elements of the individuals whose position is to be located, for example by means of spread-spectrum radio means.

Should the communication between the beacons be done by radio means, the means of communication between the beacons and the members of the network may be the same.

The means of communication between the beacons and the members of the network whose position is to be located may be the same as the standard means constituting the sound, video or fixed-image communications network between the objects and the persons. This has the advantage especially of achieving the position-finding with usual communications means.

According to another alternative embodiment, the spread-spectrum radio means between the members of the network whose position is to be located and the beacons are of different types. They include direct sequence waveforms (PN code), UWB, FHSS (Frequency Hopping Spread Spectrum), Chirp type frequency ramp, etc. The characteristic common to all the beacons is that they are spread-spectrum beacons with a minimum spread, equal to 10 MHz for example.

The characteristics of the beacons especially are that they are small-sized, easily positioned and can be made at low-cost. Thus, they can be dropped by parachute, launched by a device, hoisted or, again, positioned by any appropriate means on the roof of the building or again at a height. The beacons remain always accessible to the satellite. They can be easily launched or placed on buildings and abandoned at the end of the operation or mission. An exemplary detail of a beacon is given in FIG. 3. This beacon is linked with the reference station and the computation station.

According to one alternative embodiment, in indoor type deployment, certain elements or members of the group, possibly better placed with respect to the outdoor beacons, are capable of relaying the transmission of the signal sent by the element whose position is to be located or which has to make its position located while, at the same time, indicating the relative positioning of the element whose position is to be located.

The following is a simple procedure to be used: the central computation system, which receives all the information contexts and carries out the consistency processing as well as the computation of the position, realizes that the positioning of the user is impossible or an aberration. It then sends an interrogation to the group (the elements of the network) to find out which is closest to the user concerned. Indeed, each member of the group knows the proximity of the others, either by the power of the signal received or by a relative positioning in distance. Each member of the group close to the user to be positioned therefore sends the proximity information pertaining to this user, namely the relative distance, signal power, transmission quality, etc., and the position of the "closest" user is located to gain a piece of rough information on the "masked" user. In many cases, the invention is used to locate the position of a group of persons or objects that are members of one and the same radio network. This same network communicates with the beacons and is therefore used for both position-finding and communications in sound or data mode.

One or more beacons are, for example, positioned at places, such as windows, that are more favorable to the reception of signals from the members of the network whose position is to be located.

All the external beacons are, for example, placed on vehicles that move according to requirements, the synchronization time (the initial time from the activation) being extremely small, of the order of one minute.

Figure 2:
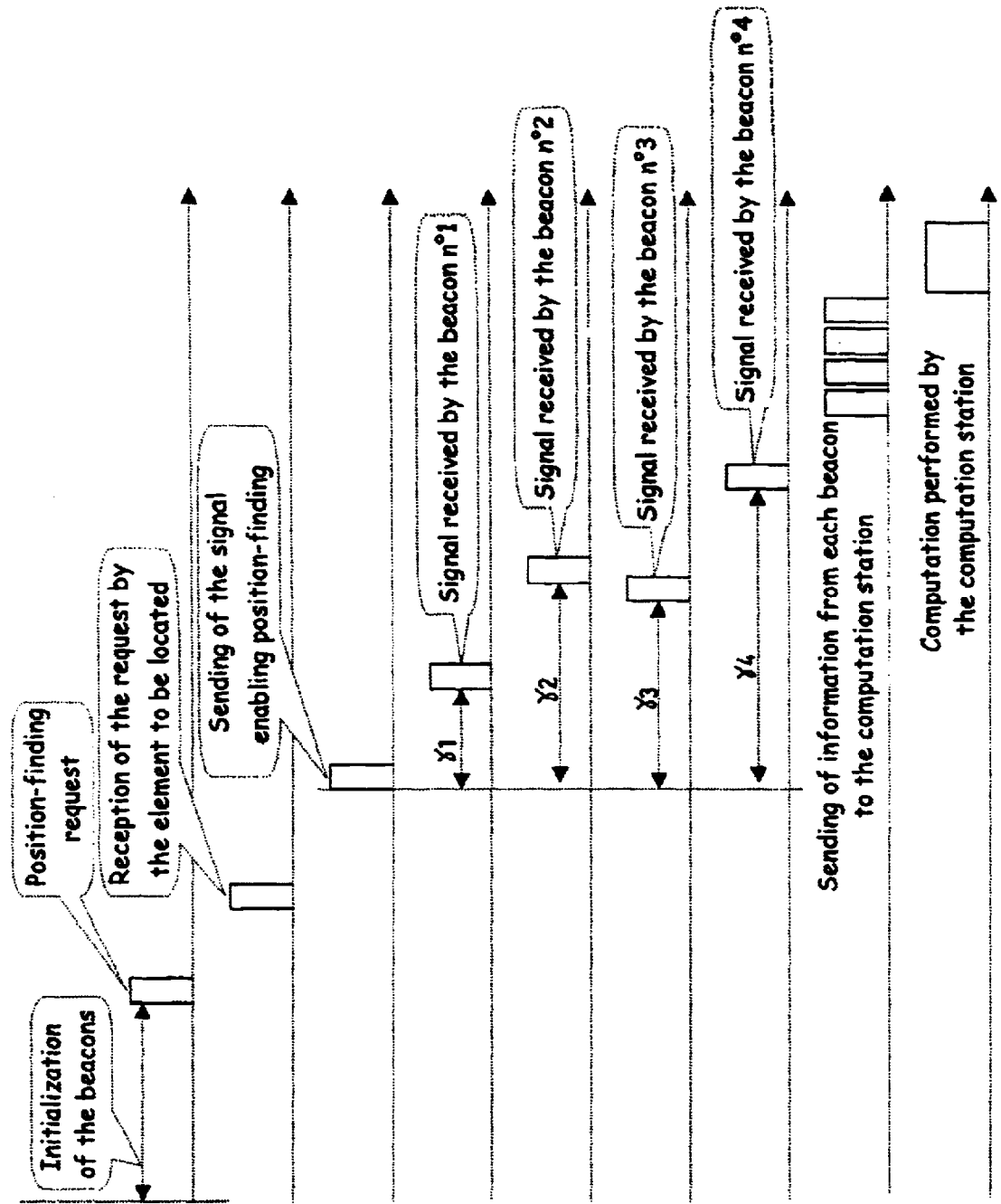
FIG. 2 exemplifies a timing diagram of the signals exchanged between an element whose position is to be located and the different beacons, FIG. 3 exemplifies the propagation of the different multiple paths, FIGS. 4, 5 and 6 exemplify different signal-processing operations.

FIG. 2 is an exemplary timing diagram of the signals exchanged according to the steps of the method.

It is known that finding the position of elements in a closed or indoor environment (namely in buildings, etc.) is affected by problems of propagation such as absorption as well as the existence of multiple paths by reflection. To cope with these phenomena, two complementary mechanisms may be implemented.

In the first mechanism, a technique for the processing of direct and reflected echoes is set up. This technique relies on the capacity of certain spread-spectrum waveforms to facilitate the determining of the direction of arrival of the different paths. The beacon, which receives the different paths, then sends the list and direction of these multiple paths (direct paths and reflected paths) to the station in charge of the position-finding computation. This station can interpret and collate these different multiple paths given by the different beacons by means of a mapping of the places.

The second mechanism relies on the capacity of certain elements or members of the group, possibly better placed relative to the outdoor beacons, to relay the transmission of the signal sent by the element whose position is to be located or which has to make its position located, while indicating the relative positioning of the element whose position has to be located.

The following example given by way of an illustration relates to the case of a request mode of position-finding.

Step 1

The initialization of the DGPS beacons (visible to the satellites) and the obtaining of precision to within the centimeter, for example for each of the beacons used. Each beacon Bi gets initialized independently of the others and needs only the reference station to be able to carry out its temporal readjustment in DGPS mode.

Step 2

The readjustment of the absolute clock of each DGPS beacon (preliminary temporal readjustment) in taking account of the difference in distance from each beacon to the satellites and using a "clock readjustment algorithm" type of readjustment algorithm known to those skilled in the art. This readjustment algorithm makes it possible especially to take account of the effects of the difference in the progress of the signals between a satellite and the beacons on the ground. Each beacon, using the information given by the reference station, performs this readjustment operation.

If the readjustment is not done at this stage, the steps described here below will remain applicable and the station responsible for the position-finding computation will then have to make the correction in the position-finding computation (final readjustment).

Step 3

As soon as there is a minimum number of synchronized beacons, for example four beacons (three beacons in a same plane and a fourth beacon outside this plane), one of the beacons is authorized to send a transmission request to the element whose position is to be located. For example, the central system itself sends the request or else it asks one of the beacons to do so if it is not within radio range of the elements whose position is to be located. Each beacon, as soon as it is operation, starts making its measurements:

- either in no-request mode, by detecting the signals sent out by the different members of the group, identifying the identification number of each received signal, sending the context of detected information namely the beacon number, the identification number of the member detected, the list of the pieces of information measured on the different multiple paths of the received signal. This is repeated for each new signal sent out by any one member of the group,
- or in request mode, in informing the computation station or any authority that it is operational. This authority than makes the request for transmission by turns, according to the needs of the members of the network. This authority is generally the same as the central computation system because the latter has information on the position of the elements and is therefore able to deduce those elements whose position needs to be located. Without departing from the framework the invention, it is possible to use another "authority" independent of the central computation system.

Step 4

The element whose position is to be located receives the position-finding request and then sends a frequency-spread signal $S_e$. Should there be a second element, defined for example as being the best placed member that is interrogated instead of the member masked according to the procedure described here above, then it is this second element that sends the frequency-spread signal $S_e$.

Step 5

The signal $S_e$ is received by the different beacons, with a delay time $\tau_i$ for each of the beacons $B_1$, $B_2$, $B_3$ and $B_4$. This delay time is proportional to the distance di between the element whose position is to be located and the beacons. This sent signal comprises for example a reference sequence.

Step 6

At each of the beacons within range of the element whose position is to be located, the arrival time of the signal is then estimated, for example by the instant of maximum correlation of the received signal with the expected reference sequence. All the beacons wait for this signature and note the precise instant of arrival of this signature. This instant is associated with an identification number of the member sending the signal. In fact, since there are multiple paths, this signature or reference signal will return several times in a very short time, according to the different reflections undergone by the signal sent by the member of the group.

Step 7

The different pieces of information on arrival time ti are then transmitted to the computation station. The arrival times are used basically to define a pseudo-distance dp between the elements whose position is to be located and the different beacons. The triangulation algorithm used is, for example, based on the intersection of the spheres having a radius equal to the pseudo-distance dp estimated for each of the beacons. Furthermore, the directions of arrival of the multiple paths associated with the pseudo-distances of these multiple paths will be used to supplement the approach based solely on the pseudo-distances of the main path.

The processor comprises, for example, the following in memory: a database representing the topology of the places, especially of the different existing obstacles. It is capable of combining these different topological data and the measurements of angle, distance and amplitude to reconstruct the multiple paths and also select the multiple paths that it will use.

Figure 3:
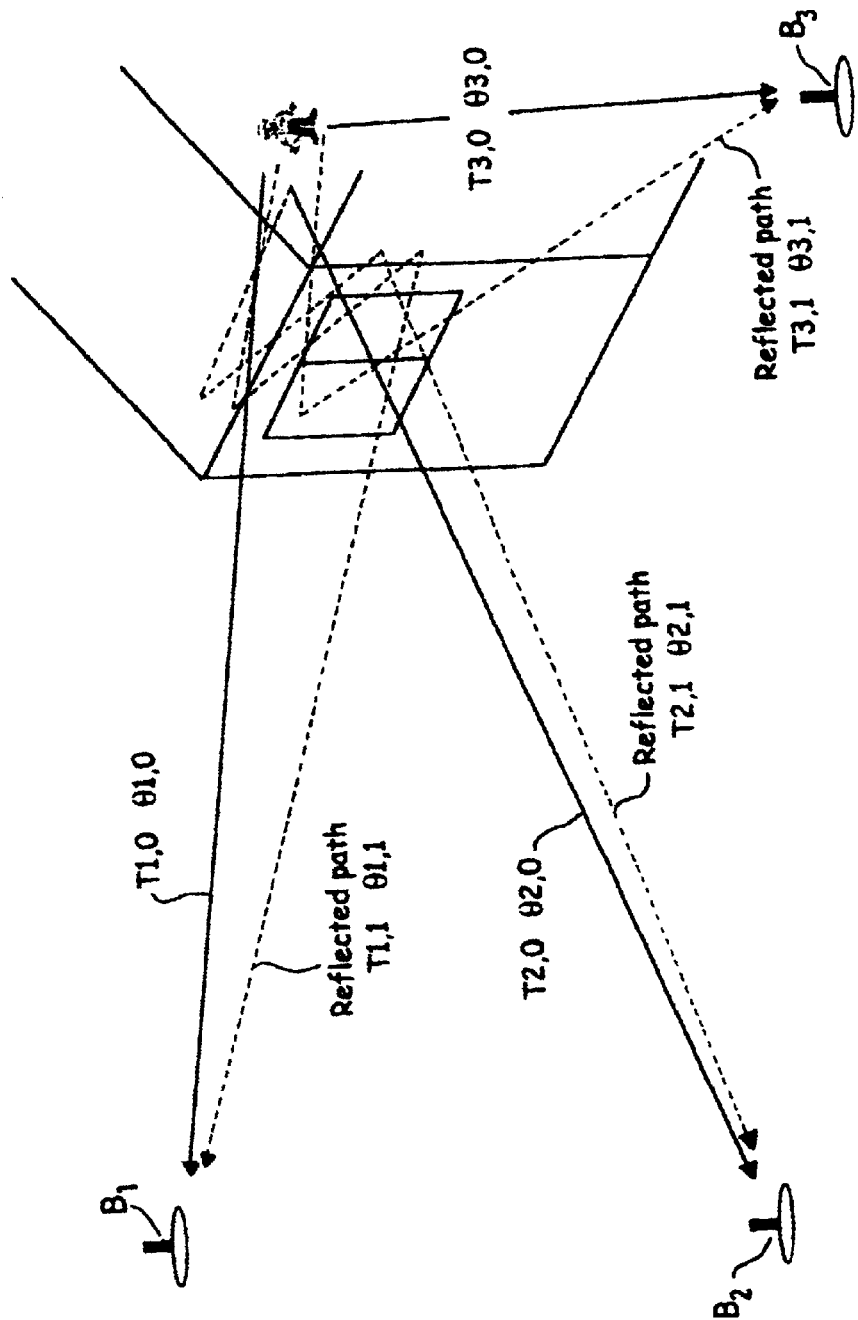

An exemplary implementation of a processing operation is given with reference to FIGS. 3, 4 and 5 described in detail further below.

Different alternative embodiments may be implemented for the step 3.

According to one embodiment, several elements whose position is to be located are assigned to making a response. In this case, a procedure of random waiting at transmission then makes it possible, at reception, to separate the signals sent out by the different elements whose position is to be located.

According to another alternative embodiments, the position-finding is done without sending out any position-finding request. This is possible, for example, for a system in which a same radio is used for the information exchanges (communications function) and for the position-finding. Thus, when an element sends out a signal to communicate, the beacons makes use of the following transmissions sent out by the same element. Indeed, the signal-to-noise ratio required to obtain a precision of about one meter is great. It is in the range of 27 dB and it may be useful, in order to obtain it, to integrate the signal over a certain duration. Thus, in this mode, it is only when an element is too late in sending a signal that it becomes necessary to make the request to force it to send the signal. This complementary mode is particularly useful to prevent the saturation of the communications network and remain silent to the maximum. In this (no-request) mode, it is the communications signals that are directly used in the steps described here above.

The precision of the system is improved, for example, by the knowledge of certain persons of the network indicating a proximity. The precision may also be reinforced by the use of a radio or several radios of the network placed in a perfectly known location.

When the synchronization between the beacons is no longer available, the transponder mode can be used on the members of the network whose position is to be located.

Following the reception of position-finding information, each member of the network may confirm that it is present or not present at its position and consequently augment the precision of the system.

An exemplary processing for the discrimination of the multiple paths is given here below with reference to FIGS. 3, 4, 5 and 6. In FIG. 3 for example, the different propagation paths $T_{m,n}$ are referenced as follows:

m designates the beacon receiving the signals, n designates the number of the direct or multiple path (0: direct path, 1: first multiple path, etc.).

The discrimination of the multiple paths is done, for example, by means of a spread-spectrum waveform (characteristic of the signal sent by the elements whose position is to be located). The different spread-spectrum methods that can be cited include frequency hopping, pseudo-random codes of the PN or other types, UWB, LWMA (Linear Wideband Multiple Access) type frequency ramp methods etc.

The spread-spectrum parameters and the minimum signal-to-noise ratio are chosen especially as a function of the precision, the maximum distance and the environment. For example, a minimum spread of 5 to 10 MHz gives, for example, precision of 1 m. Furthermore, the frequency hopping type or PN code type spread-spectrum methods enable the discrimination of the echoes in distance. The UWB method, owing to its spread in the absence of carriers, is capable of distinguishing the echoes in distance with a high precision of about one centimeter or about ten centimeters.

The LWMA method is capable of achieving a twofold discrimination of the echoes in distance and in direction. This method is described in detail here below by way of an exemplary illustration that in no way restricts the scope of the invention.

In the case of a frequency ramp, the following is the signal $S_e$, sent out by an element whose position is to be located, and received by an antenna ($A_1$ FIG. 4):

$$S_1(t) = \sum_{i=0}^{N-1} a_i e^{-j\{2\pi f_i(t-\tau_i/2)+\varphi_i\}} \quad (1)$$

This signal is formed by a direct signal and by (N-1) multiple paths, with:
- $a_0$: the amplitude of the direct path
- $a_i(i\neq 0)$: the amplitudes of the multiple paths
- $f_0$: beat frequency due to the direct path
- $f_i(i\neq 0)$: beat frequencies due to the multiple paths
- $\tau_0$: transmission delay of the direct paths
- $\tau_i(i\neq 0)$: transmission delay of the multiple paths
- $\phi_0$: phase of the signal of the direct path
- $i(i\neq 0)$: phases of the signals of the multiple paths The beat frequency is related to the transmission delay by the relationship (2): $f_i = s\,\tau_i$ in which s is the slope of the ramp.

The phase of the signal is related to the transmission delay by the relationship (3): $(\phi_i = 2\pi f_c \tau_i$ where $f_c$ represents the carrier at the start of the ramp.

The transmission delay is related to the distance by the relationship (4): $\tau_i = d_i/c$ in which c represents the speed of propagation of the electromagnetic waves.

If we consider another omnidirectional antenna in reception (indexed 2), the received signal is then:

$$S_2(t) = \sum_{i=0}^{N-1} a_i e^{-j\{2\pi(f_i+\Delta f_i)(t-1/2(\tau_i+\Delta\tau_i))+\varphi_i+\Delta\varphi_i\}} \quad (5)$$

Figure 4:
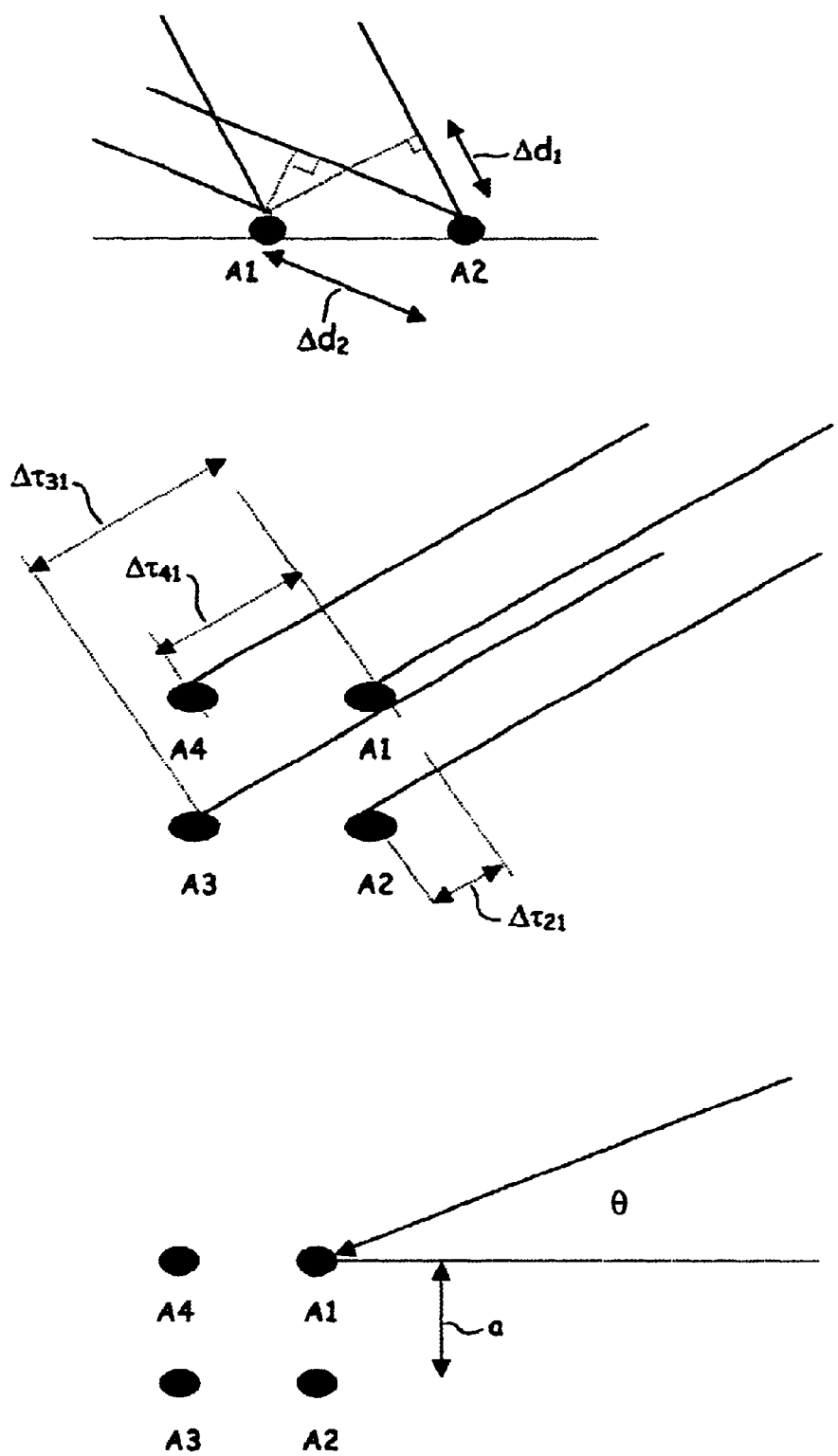
Figure 5:
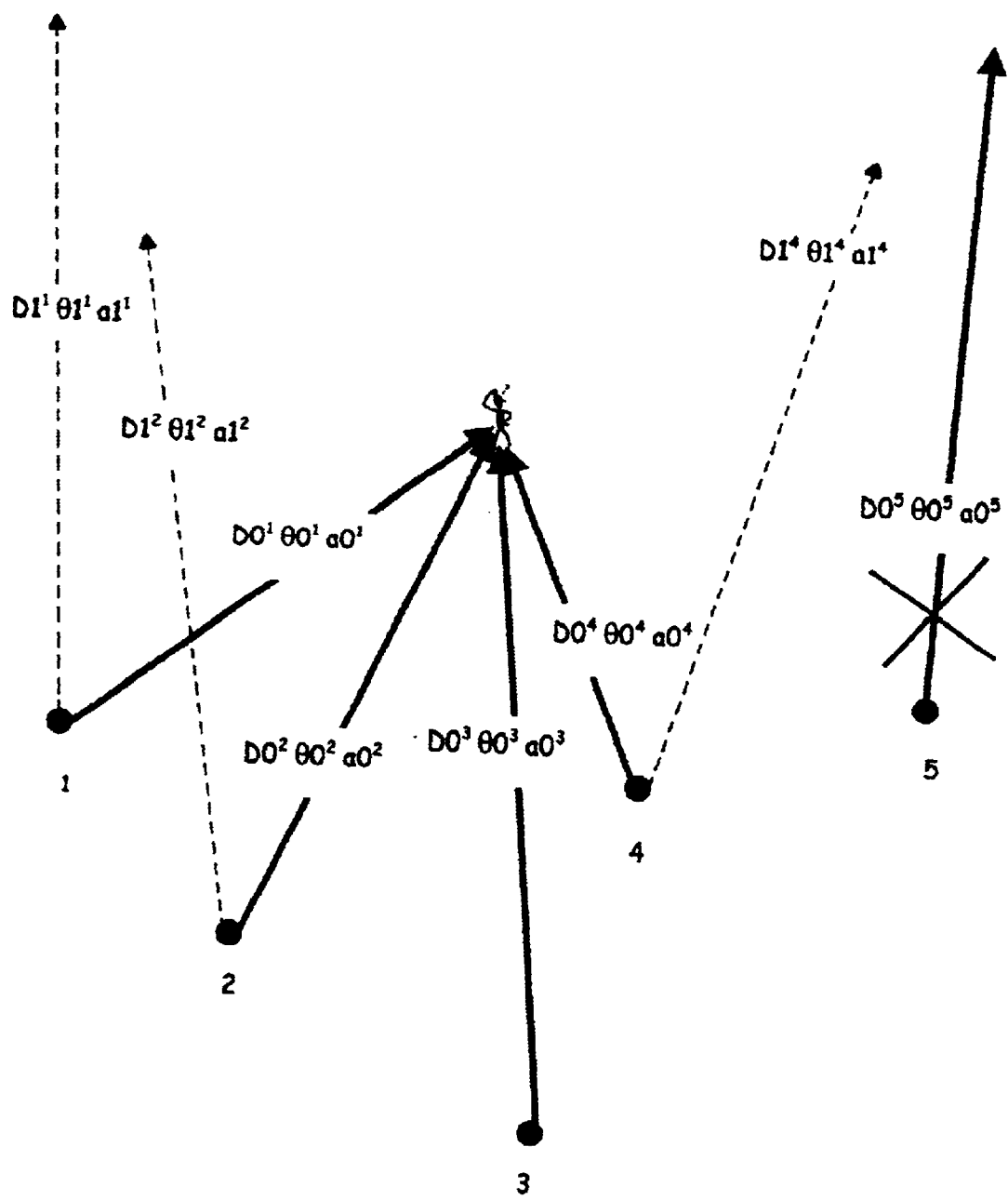

The differences $\Delta f_i$, $\Delta\phi_i$, $\Delta\tau_i$ are prompted by the stretching or reduction of the path $\Delta d_i$ to reach the second antenna ($A_2$ FIG. 4), according to the orientation of the waves relative to the axis of two antennas as shown diagrammatically in FIG. 4.

$\Delta f_i = s\,\Delta\tau_i$ $\Delta\phi_i = 2\pi f_c \Delta\tau_i$ $\Delta\tau_i = \Delta d_i/c$ Thus, by using a set of antennas, it is possible to distinguish the signals of the multiple paths and indicate the corresponding direction of arrival for each of them.

For example, when the multiple paths are distinguished by means of the LWMA technique, they are characterized by the following variables:

$f_i = s\,\tau_i$ $\phi_i = 2\pi f_c \tau_i$ $\tau_i = d_i/c$ and by the three additional variables mentioned here above $\Delta f_i$, $\Delta\phi_i$, $\Delta\tau_i$ depending on the differences in propagation time between the first and second antennas. All the quantities $\Delta f_i$, $\Delta\phi_i$, $\Delta\tau_i$ of the $i^{st}$ multiple path depend on $\Delta d_i$, which is the difference in distance for this multiple path between the first and the second antenna.

This means that a signal coming from a given direction has frequency shifts in addition to the phase differences obtained on the fixed-frequency devices. This additional parameter may be advantageously used to discriminate between the different multiple paths.

The processing method can also be extended to a system comprising four antennas $A_1$, $A_2$, $A_3$, $A_4$ (FIG. 4).

The signals are then the following (6):

$$S_1(t) = \sum_{i=0}^{N-1} a_i e^{-j\{2\pi f_i(t-\tau_i/2)+\varphi_i\}}$$

$$S_2(t) = \sum_{i=0}^{N-1} a_i e^{-j\{2\pi(f_i+\Delta f_i^{21})(t-(\tau_i+\Delta\tau_i^{21})/2)+\varphi_i+\Delta\varphi_i^{21}\}}$$

$$S_3(t) = \sum_{i=0}^{N-1} a_i e^{-j\{2\pi(f_i+\Delta f_i^{31})(t-(\tau_i+\Delta\tau_i^{31})/2)+\varphi_i+\Delta\varphi_i^{31}\}}$$

$$S_4(t) = \sum_{i=0}^{N-1} a_i e^{-j\{2\pi(f_i+\Delta f_i^{41})(t-(\tau_i+\Delta\tau_i^{41})/2)+\varphi_i+\Delta\varphi_i^{41}\}}$$

The exponent mn signifies: signal on the $m^{th}$ antenna in taking account of the path to be traveled relative to the $n^{th}$ antenna Example: $\Delta f_i^{31}$ represents the difference in frequency due to the $i^{th}$ multiple path arriving at the $3^{rd}$ antenna in taking account of the path to be traveled relative to the $1^{st}$ antenna (path difference for this multiple path between the $3^{rd}$ antenna and the $1^{st}$ antenna).

The signals have the following general form (7):

$$S_k(t) = \sum_{i=0}^{N-1} a_i e^{-j\{2\pi(f_i+\Delta f_i)(t-(\tau_i+\Delta\tau_i)/2)+\varphi_i+\Delta\varphi_i\}}$$

The following are the different terms:

$T_1 = \{2\pi f_i(t-\tau_i/2)+\varphi_i\} \Rightarrow$ basic terms  (8)

$T_2 = \{2\pi f_i \Delta\tau_i/2\} \Rightarrow$ additional term  (9)

$T_3 = \{2\pi\Delta f_i(t-\tau_i/2-\Delta\tau_i/2)+\Delta\varphi_i\} \Rightarrow$ other additive term  (10)

Numerical Example a=30 cm whence $\Delta\tau_{i\ max}$=1 ns where a is the distance between the antennas. Should there be four antennas, a corresponds to the side of the square plotted by the four antennas.

$f_{i\ max}$=66 kHz for d=1000 m and a slope of (20 MHz, 1 ms)=20 $10^9$ Hz/s, where d is the distance between the element whose position is to be located and the beacon.

$f_{i\ max}\Delta\tau_{i\ max}\sim 10^{-4}$ hence the term $T_2$ is negligible.

$\Delta f_{i\ max}$=1 ns*20 $10^9$=20 Hz $\Delta\tau_{i\ max}\Delta f_{i\ max}$=negligible $\Delta\phi_{i\ max}=2\pi f_c\Delta\tau_{i\ max}$: non-negligible due to the carrier frequency.

Finally, the expression of the signal may be simplified and reduced to the following form:

$$S_k(t) = \sum_{i=0}^{N-1} a_i e^{-j\{2\pi f_i(t-\tau_i/2)+\varphi_i\}} e^{-j\{2\pi \Delta f_i t + \Delta \varphi_i\}} \quad (11)$$

Whence:

$$S_1(t) = \sum_{i=0}^{N-1} a_i e^{-j\{2\pi f_i(t-\tau_i/2)+\varphi_i\}}$$

$$S_2(t) = \sum_{i=0}^{N-1} a_i e^{-j\{2\pi f_i(t-\tau_i/2)+\varphi_i\}} e^{-j\{2\pi \Delta f_i^{21} t + \Delta \varphi_i^{21}\}}$$

$$S_3(t) = \sum_{i=0}^{N-1} a_i e^{-j\{2\pi f_i(t-\tau_i/2)+\varphi_i\}} e^{-j\{2\pi \Delta f_i^{31} t + \Delta \varphi_i^{31}\}}$$

$$S_4(t) = \sum_{i=0}^{N-1} a_i e^{-j\{2\pi f_i(t-\tau_i/2)+\varphi_i\}} e^{-j\{2\pi \Delta f_i^{41} t + \Delta \varphi_i^{41}\}}$$

Different algorithms for the processing of these signals may be used to reveal the different quantities of the multiple paths.

In one of the simplest algorithms, a spectral analysis is performed on each of the signals of the different antennas. Thus, for each antenna and for each member of the network that makes transmission, Prony's method is used to determine the frequencies, the amplitudes, the initial phases as well as the damping coefficients. The frequencies and the phases for the different antennas may be directly compared with one another to give the direction of each multiple paths (including the direct path).

Other methods, more optimized and better adapted to the particular context of the signals and known to those skilled in the art, may also be used without departing from the framework of the invention.

When the multiple paths have been identified, the method is carried out, for example, as follows.

In addition to its precise GPS position and for the signal sent by a member to be positioned, each beacon then transmits a list of multiple paths with the time and the direction of arrival of each of the multiple paths. Thus there is a set of data expressed as follows:

Beacon No. 1
GPS position of beacon 1
N° xyz of the member
$a_{1,0}$; $t_{1,0}$, $\theta_{1,0}$
$a_{1,1}$; $t_{1,1}$; $\theta_{1,1}$
. . .
$a_{1,j}$; $t_{1,j}$; $\theta_{1,j}$
where {0,1, . . . i} correspond to the indices of the different multiple paths.
Beacon No. 2
GPS position of beacon 2
No. xyz of the member
$a_{2,0}$; $t_{2,0}$; $\theta_{2,0}$
$a_{2,1}$; $t_{2,1}$; $\theta_{2,1}$
. . .
$a_{2,j}$; $t_{2,j}$; $\theta_{2,j}$
Beacon n° N
GPS position of beacon i
No. xyz of the member
$a_{N,0}$; $t_{N,0}$; $\theta_{N,0}$
$a_{N,1}$; $t_{N,1}$; $\theta_{N,1}$
. . .
$a_{N,j}$; $t_{N,j}$; $\theta_{N,j}$
The computation station:
receives all this information (GPS position, beacon 1; echo 1: amplitude, arrival time, angle of arrival, echo 2, etc.)
readjusts the time-related information in the case of a detected shift of one or more beacons,
computes the estimated positions of the mobile or of the element whose position is to be located for the information context received from each beacon, and
then processes the data in three possible modes First Mode Illustrated in FIG. 5:

The first mode consists in comparing the readjusted data and eliminating the information from the beacon or beacons that diverges excessively from the indicated value, for example information that diverges by the greatest number. This is possible especially if the number of beacons is greater than the minimum number 4 to make the measurement. $D_{k,i} \theta_{k,i} a_{k,i}$ corresponds to the path No. i received by the beacon k.

For the beacon 1: $D_{1,0} \theta_{1,0} a_{1,0}$ . . . , $D_{1,1} \theta_{1,1} a_{1,1}$. . . , $D_{1,2} \theta_{1,2} a_{1,2}$. . .
. . .
For the beacon 2: $D_{2,0} \theta_{2,0} a_{2,0}$ . . . , $D_{2,1} \theta_{2,1} a_{2,1}$ . . . , $D_{2,2} \theta_{2,2} a_2$ . . . ,
For the beacon N: $D_{N,0} \theta_{N,0} a_{N,O}$ . . . , $D_{N,1} \theta_{N,1} a_{N,1}$ . . . , $D_{N,2} \theta_{N,2} a_{N,2}$ In this example, the signals of the beacon No. 5 are withdrawn because they are excessively error-ridden. The definitive position of the element whose position is to be located is computed in taking account of the direct paths coming from the other four beacons. The paths, other than the direct ones, are not exploited in this mode.

Figure 6:
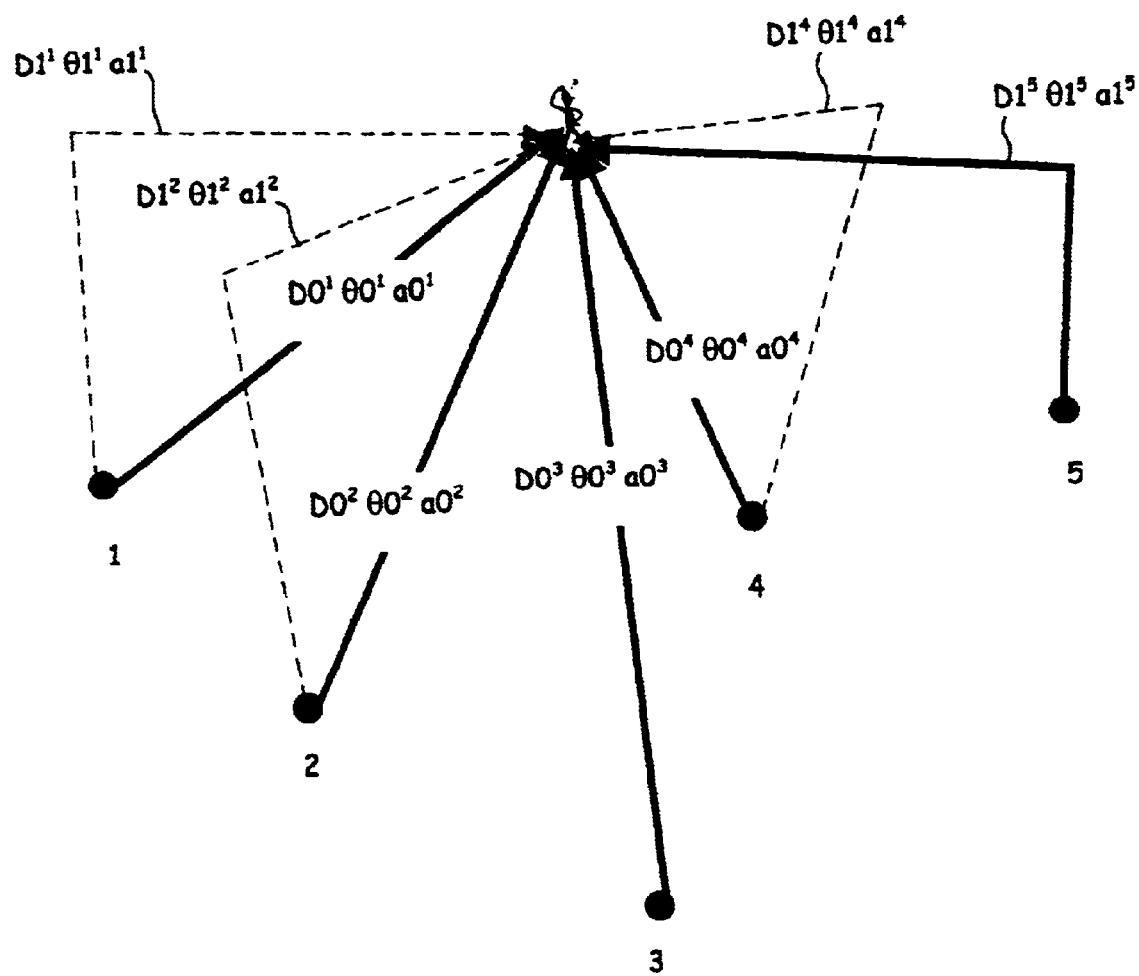

Second Mode Illustrated in FIG. 6

The second mode consists, for example, in taking account of the information on the multiple paths by comparing the readjusted data with a mapping database. The multiple paths are then interpreted in addition to the direct paths. Furthermore, in certain situations of propagation, the direct paths are not received and the first echo is wrongly classified as a direct path. This method is used to test the possibility that an echo, taken as being direct, may actually be a multiple path.

Thus FIG. 6 gives a schematic view of the reconstruction of the multiple paths in taking account of the data transmitted to the computation station as well as a database (or mapping) representing the different existing obstacles.

Third Mode

In the third mode, a very precise piece of positional information is received by radio (for example the message may state: "mobile X exactly at the fountain") and the system is calibrated according to the information received.

Figure 7:
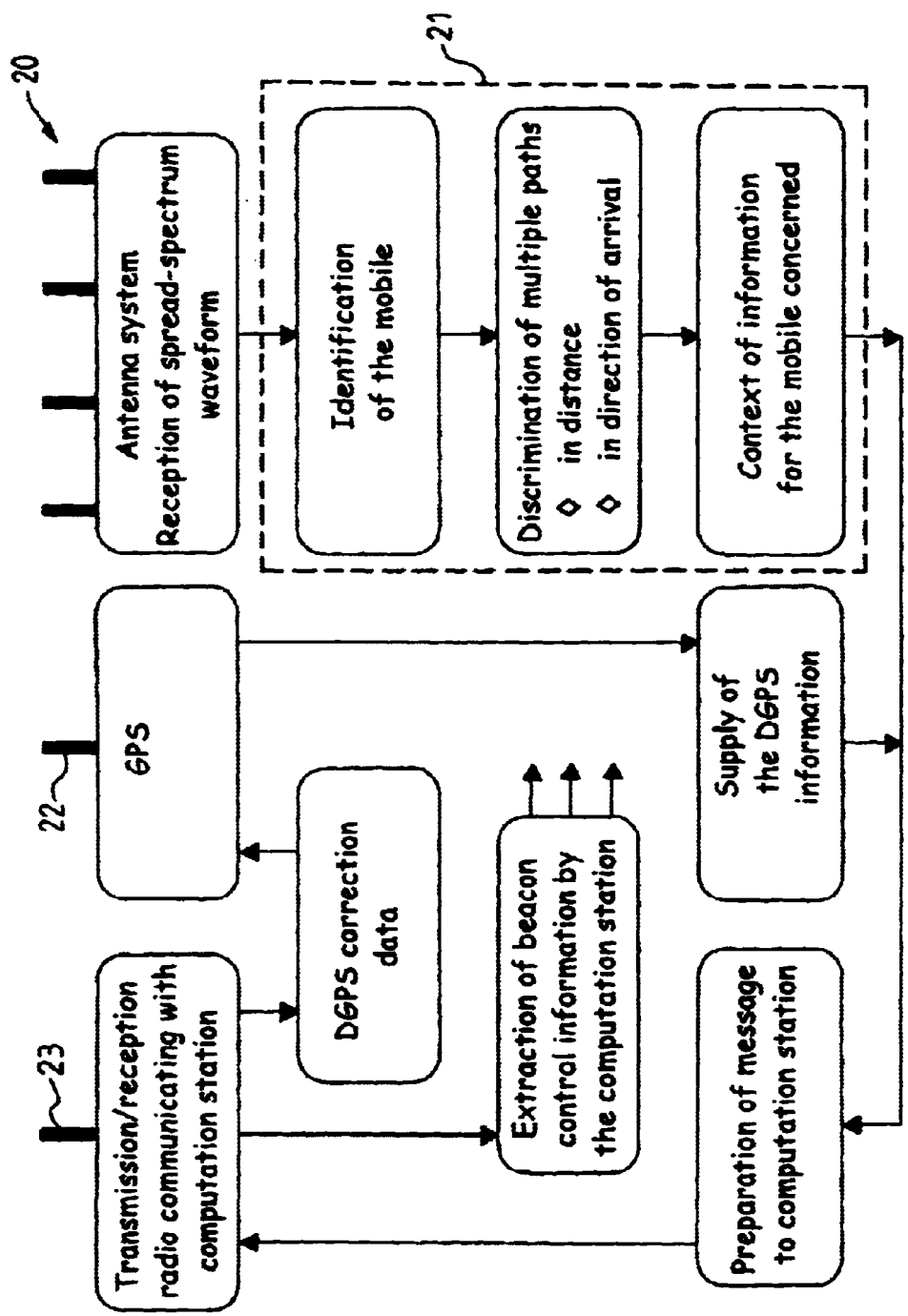
FIG. 7 shows a detail of the beacon according to the invention, and its links with the computation station and the reference station.

FIG. 7 gives a schematic view of a possible detail of the beacon and its links with a computation station and the reference station.

A beacon comprises, for example, a part I designed especially to receive the spread-spectrum signal sent by the element whose position is to be located; this is done by means of an antenna system 20 comprising a set of four antennas, for example adapted to the reception of spread-spectrum waveforms. This part comprises a processor 21 capable of identifying the mobile element to be identified, for example by means of the message included in the header. Once the mobile is identified, the processor carries out different processing operations, such as discriminating the multiple paths in distance and in direction of arrival, and it also determines the amplitude of the signal. At the end of this processing operation, the beacon possesses a context of information for the mobile concerned. This information is expressed for example in the form of a set ai,j; ti,j; θi,j with i being the index of the beacon concerned and j being the index of a multiple path.

The beacon also has a part II comprising for example an antenna 22 chosen to receive the GPS signals.

It also has another transmitter-receiver antenna 23 which communicates with the computation station and also the reference station $B_{ref}$ to receive DGPS correction data.

The context of information for the element whose position is to be located as well as the DGPS data (precise position of the beacon) is transmitted in the form of a message to the computation station by means of the antenna 23. This antenna 23 receives the DGPS correction data which it sends to the GPS positioning part.

If necessary, this arrangement is given an additional stage of radio transmission to the mobile, if the distance measurement is done not only by passive listening and not only through a request from the computation station but also by any beacon (preferably the best-placed beacon) upon a preliminary command from the computation station for example.

In certain cases, the control station may also control the motions of the different beacons. This alternative embodiment especially enables dynamic 3D position-finding.

The system can also work in a simplified mode in which the mapping is no longer used and in which the multiple paths are no longer taken into consideration.

What is claimed is:

1. A precise 3D position-finding system for locating members of a network comprising at least the following elements: a set of beacons working on the basis of differential global positioning satellites (DGPS), the beacons being connected to one another and temporally synchronized, spread-spectrum radio means between the members of the network whose position is to be located and said beacons, and a computation station, wherein the computation station is provided with a processor adapted to finding the position of one or more elements from a list of direct paths and/or multiple paths with the time and direction of arrival of each of the direct paths and/or multiple paths, and from the position of the beacons and in taking account of data that represents obstacles.

2. The system according to claim 1, wherein the number of beacons is at least equal to four, three of them being positioned in the same plane and the fourth having a given altitude relative to this plane.

3. The system of claim 2, wherein the means of communication between the beacons and the members of the network whose position is to be located are identical or appreciably identical to the standard means that constitute the communications network and accept sound, video and fixed images.

4. The system according to claim 1, wherein the spread-spectrum radio means, between the members of the network whose position is to be located and the beacons, are of different types.

5. The system of claim 4, wherein said beacons are one of direct sequence waveforms (PN code), UWB, FHSS (Frequency Hopping Spread Spectrum), chirp type frequency ramp.

6. The system according to claim 1, wherein the means of communication between the beacons and the members of the network whose position is to be located are identical or appreciably identical to the standard means that constitute the communications network and accept sound, video and fixed images.

7. A method for the 3D positioning of an element in a system comprising at least four beacons working on the basis of the differential global positioning system (DGPS), the beacons being temporally synchronized, wherein the method comprises at least the following steps:

the transmission, by a beacon of a DGPS position of the beacon and of a list of multiple paths with the time and direction of arrival of each of the direct paths and/or the multiple paths sent by the element whose position is to be located, temporal readjustment, if necessary/in the event of a detected shift, of one or more beacons, the computation of the estimated positions of the element for the context of information received from each beacon, a processing of the data using a mapping or a topology of the environment in which the element whose position is to be located is placed to reconstruct the different direct paths and/or multiple paths and select the multiple paths to achieve a precise 3D determining of the element whose position is to be located.

8. The method according to claim 7, wherein the position-finding is done by examining the communications signals sent in the course of time by the element or elements to whose position is to be located.

9. The method according to claim 8, wherein the signals exchanged between the beacons and the members of the network whose position is to be located are identical or appreciably identical to the standard means that constitute the communications network and accept sound, video and fixed images.

10. The method according to claim 7, wherein the signals exchanged between the beacons and the members of the network whose position is to be located are identical or appreciably identical to the standard means that constitute the communications network and accept sound, video and fixed images.

11. The method according to claim 7, using spread-spectrum radio means, between the members of the network whose position is to be located and the beacons, that are of different natures, such as direct sequence waveforms (PN code), UWB, FHSS (Frequency Hopping Spread Spectrum), chirp type frequency ramp, etc.

12. The method according to claim 7, wherein the data-processing comprises a step to compare the readjusted data and a step to eliminate information from the beacon or beacons that diverge excessively from the value indicated by the greatest number of beacons.

13. The method according to claim 12, wherein the signals exchanged between the beacons and the members of the network whose position is to be located are identical or appreciably identical to the standard means that constitute the communications network and accept sound, video and fixed images.

14. The method according to claim 12, using spread-spectrum radio means, between the members of the network whose position is to be located and the beacons, that are of different natures, such as direct sequence waveforms (PN code), UWB, FHSS (Frequency Hopping Spread Spectrum), chirp type frequency ramp, etc.

15. The method according to claim 7, wherein the processing of the data comprises the taking into account of information on the multiple paths by comparing the readjusted data with a mapping database.

16. The method according to claim 15, wherein the signals exchanged between the beacons and the members of the network whose position is to be located are identical or appreciably identical to the standard means that constitute the communications network and accept sound, video and fixed images.

17. The method according to claim 15, using spread-spectrum radio means, between the members of the network whose position is to be located and the beacons, that are of different natures, such as direct sequence waveforms (PN code), UWB, FHSS (Frequency Hopping Spread Spectrum), chirp type frequency ramp, etc.

18. The method according to claim 7, wherein one of the beacons sends a request in order to locate the position of the element.

19. The method according to claim 18, wherein the signals exchanged between the beacons and the members of the network whose position is to be located are identical or appreciably identical to the standard means that constitute the communications network and accept sound, video and fixed images.

20. The method according to claim 18, using spread-spectrum radio means, between the members of the network whose position is to be located and the beacons, that are of different natures, such as direct sequence waveforms (PN code), UWB, FHSS (Frequency Hopping Spread Spectrum), chirp type frequency ramp, etc.

* * * * *